United States Patent Office 3,401,605
Patented Sept. 17, 1968

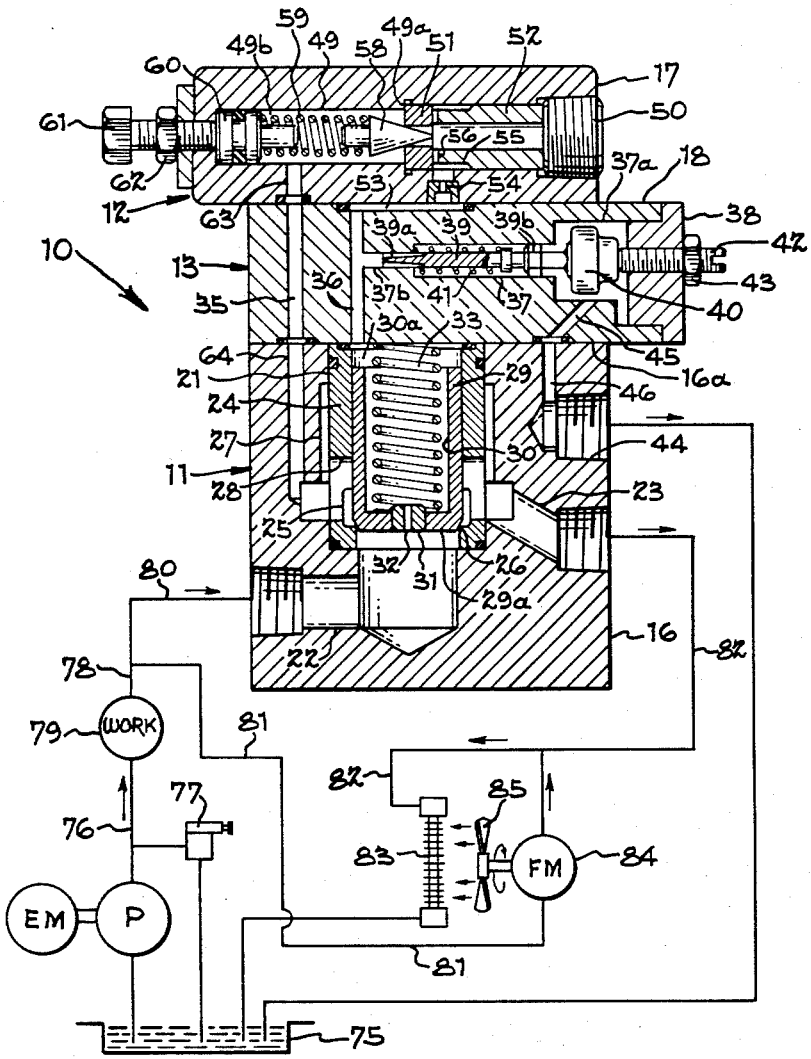

3,401,605
TEMPERATURE RESPONSIVE HYDRAULIC
SYSTEM AND VALVE MEANS THEREFOR
Ellis H. Born, Columbus, Ohio, assignor to Abex Corporation, New York, N.Y., a corporation of Delaware
Filed Sept. 13, 1966, Ser. No. 579,122
11 Claims. (Cl. 91—419)

ABSTRACT OF THE DISCLOSURE

A temperature responsive valve for regulating the rate of flow of fluid in a hydraulic circuit in accordance with the temperature of the fluid. The valve includes a differential pressure operated main valve, a variable orifice for controlling the pressure differential across the main valve and a thermostatically controlled actuator for varying the area of the orifice in accordance with the fluid temperature. Also disclosed is a circuit for cooling hydraulic fluid at an increasing rate as the fluid temperature increases.

---

This invention relates to means for controlling the temperature of the operating fluid in a hydraulic circuit. More specifically, the invention is directed to a hydraulic system and valve mechanism for use in the system whereby cooling is applied at an increasing rate to the system fluid as the fluid temperature increases.

In any typical hydraulic circuit or system, such as for example a circuit in which the operating fluid is pressurized by a pump and is delivered to a work load and recirculated, the temperature of the fluid tends to increase with continued or prolonged operation of the system, due to the work done on the fluid. If uncontrolled, the fluid temperature may rise from, say, initial room temperature conditions up to 180° F. or even higher. It has been recognized that severe increases in the temperature of the operating fluid in hydraulic systems are undesirable for a number of reasons, including undesirably rapid fluid degradations at high temperatures, viscosity changes which affect the stability of operation of hydraulic control components in the circuit, difficulty in handling, and overheating of associated equipment.

One means which has been used in the past to alleviate operational overheating of the system fluid is the circulation of the fluid through heat exchange media, for example, an oil-to-air cooler wherein some of the heat is dissipated. Such techniques of course do effect an improvement, but they have not kept the fluid temperature as low or as constant as is desirable, particularly where the heat-up rate is large.

In accordance with this invention means are provided for applying cooling at a progressively increasing rate to the system fluid as the temperature of the fluid increases. Such cooling is effected by automatically causing fluid cooling means to operate at a more rapid rate, and hence to remove heat from the fluid at a greater rate, as the temperature of the fluid increases.

According to one form of hydraulic system incorporating the principles of this invention, the discharge flow from the work load is passed to a finned heat exchanger through either one or both of a pair of branch circuits, one of which includes a fluid motor driving a fan or other means for circulating cooling media over the heat exchanger at a rate depending upon the rate of operation of the fan fluid motor. The other branch line incorporates a thermostatically controlled by-pass valve which is responsive to the temperature of fluid discharging from the work load. This valve controls the relative proportion of the discharge flow which by-passes the heat exchanger fluid motor and hence controls the rate of operation of the fluid motor and the rate of cooling of the fluid.

The preferred temperature responsive valve structure contemplated by this invention includes a pressure differential operated main valve section for varying the flow of fluid between the inlet and outlet ports of the valve. Pressure at the inlet port of the valve exerts an opening force on the movable valve member, and is opposed by a spring force and by a pressure force which is varied with the temperature of the fluid. The magnitude of the opposing pressure force is regulated by a variable orifice in a metering valve section which creates a pressure differential or drop, relative to the inlet pressure, corresponding to the fluid temperature by a dimensionally responsive thermostatic actuator which operates the movable metering valve element. The actuator is effective to decrease the area of the orifice and thereby decrease the differential across the main valve element as temperature increases, so that the main valve will be closed, or more nearly closed, at higher temperatures. This diverts a greater proportion of the work load discharge through the heat exchanger fluid motor which will thereby be operated more rapidly and will cool more intensively. Optional structure is also provided whereby the main valve is caused to open automatically, regardless of the temperature of the fluid, at any time the pressure differential between the inlet and outlet ports of the main valve becomes excessive.

The structure and operation of these valves can best be further explained by reference to the accompanying drawing, which is an axial section through a preferred form of thermostatically controlled valve incorporating the features of this invention, as incorporated in a hydraulic circuit, shown diagrammatically, for operating a fluid motor and for stabilizing the temperature of the hydraulic fluid in the circuit.

The thermostatically controlled valve designated generally by 10 in the drawing is preferably comprised of three general sections, a main valve section 11, a pilot valve section 12, and a temperature responsive metering valve or sandwich section 13. The valve sections 11, 12 and 13 can suitably be contained in separate body portions 16, 17 and 18 respectively, body portion 18 preferably being in the form of a sandwich portion which is secured between body portions 16 and 17 by suitable means not shown.

The main valve section 11 includes pressure differential operated main valve-forming elements which directly control the flow of fluid in the hydraulic line in which the valve 10 is connected. Body portion 16 has a stepped axial bore 21, with the inner end of which an inlet port 22 communicates and with the side of which an outlet port 23 communicates. A cylindrical sleeve 24 is fitted and sealed in bore 21 and is held against a shoulder therein by the lower surface of body portion 18. This sleeve 24 is provided with an internal groove 25 adjacent the lower end thereof, and an annular seat 26 is defined adjacent groove 25, the seat 26 having an internal opening leading to port 22. Sleeve 24 is suitably sealed in bore 21, and to the bottom surface of body portion 18, by means such as the O-rings shown. Internal groove 25 in sleeve 24 communicates with a groove 27 formed around body bore 21 through spaced radial ports 28 formed in the sleeve, and body groove 27 in turn communicates with outlet port 23.

A movable main valve element or cylindrical poppet 29 is slidably disposed within sleeve 24 and has a tapered lower edge surface which cooperates with right angular seat 26 to form the main valve, shown in the drawing in closed position. Poppet 29 is provided with an internal bore 30, and a plug 31 having an orifice or flow restrictor 32 through it is threaded into an opening at the lower end 29a of the poppet. The orifice 32 provides fluid communication at all times between the two opposed control surfaces constituted by the upper and lower end areas of poppet 29. A low rate spring 33 is disposed in poppet bore 30 and urges the poppet 29 toward engagement with seat 26. By way of illustrative example, orifice 32 may be 0.025 inch in diameter and spring 33 may exert a force of 40 or 50 pounds when the poppet is in closed position.

Sandwich portion 18 which facially engages the planar upper surface 16a of main body portion 16 has two vertical through bores or passageways 35 and 36. Bore 36 is intersected by a transverse or horizontal stepped bore 37. Bore 37 has an enlarged portion 37a which is closed by an end cap 38 secured to body portion 18.

A conically tapered metering valve element 39 is mounted for axial movement in bore 37, and includes a cylindrical tip portion 39a having tapering or slanting longitudinally extending slots formed around it. The slotted tip portion 39a of metering valve element 39 is slidably received in a portion 37b of bore 37, and forms a variable orifice with the bore. Valve element 39 is supported for axial movement in bore 37 by a flatted or longitudinally slotted shoulder 39b, and is operated with respect to bore portion 39a by a thermostatic actuator designated at 40, which thus controls the area of the metering orifice. This actuator 40 is dimensionally responsive to the temperature of fluid in which it is immersed in bore portion 37a. Metering valve element 39 is urged into engagement with thermostatic actuator 40 by a return spring 41. The actuator 40 is axially positionable in bore portion 37a by an adjusting screw 42 which may be locked in desired position by a lock nut 43.

Thermostatic actuator 40 should be capable of moving metering valve element 39 axially a distance of a few thousandths of an inch in response to the change in hydraulic fluid temperature which occurs with continued operation of the system into which the valve 10 is connected. Such actuators are commercially available, one suitable type being sold under the trademark "Vernatherm," Model No. S-160, manufactured by American-Standard, Controls Division, 5900 Trump Ave., Detroit, Mich. That particular actuator is capable of moving the metering valve element 39 a distance of .008″ in response to a temperature change of 60° F., from 100° F. to 160° F., with a force of twenty pounds. By way of example, for use with this particular actuator, return spring 41 may suitably have a rate of 16 lbs. Bore chamber 37a is connected to a drain port 44 in the main body portion 16 through a passageway 45 formed in the sandwich body portion 18 connecting with a passageway 46 in the main body portion 16.

The pilot or relief valve section 12 which is contained within cap or body portion 17 is secured atop the upper surface of sandwich body portion 18. The cap has a transverse or horizontal stepped bore 49 which is closed at one end by a plug 50. A pilot valve seat 51 is clamped against a shoulder 49a in bore 49, by a sleeve 52. Fluid communication between vertical passageway 36 in body portion 18 and the interior of sleeve 52 is provided through a slot 53 formed in body 18, a vertical passageway formed in cap 17 which includes a restricted orifice 54, an external circumferential groove 55 around sleeve 52 and radial slots 56 across the inner end of the sleeve. Plug 50 bears against the other end of sleeve 52, thereby urging the sleeve against valve seat 51 and holding the latter against bore shoulder 49a.

A tapered movable pilot valve element 58 is urged against seat 51 by a compression spring 59 disposed in cap bore portion 49b. Spring 59 is supported at its other end by spring retaining and sealing means 60 in bore portion 49b, and the compression of spring 59 is adjustable by means of a screw 61 which is threaded into cap 17 and secured by lock nut 62. Constant fluid communication between the pilot valve bore portion 49b which is downstream of pilot valve 51, 58, and main valve outlet port 23 is provided at all times by a passageway 63 in the cap which communicates with vertical passageway 35 in the sandwich portion 18, which in turn communicates with a passageway 64 in main body 16 providing communication to groove 27 in the main body bore 21. As will be seen from the drawing, it is contemplated that suitable fluid seal means be used around the interconnecting passageways, at the interfaces between the various body portions.

This pilot valve section 12 is a desirable but not an absolutely essential component of the invention, and it may be omitted altogether or a separate relief valve may be used in its place.

In the operation of the valve 10, it is the metering valve section 13 which ordinarily controls the degree to which the main valve is opened. Fluid pressure applied at inlet 22 acts upwardly on the lower control surface 29a of poppet 29, tending to open the main valve 26, 29. Fluid pressure in chamber 30a acts on the upper control surface area of poppet 29 and, together with the force of spring 33, tends to close the main valve 26, 29. Since chamber 30a is at all times connected to drain port 44 through metering valve 37b, 39a, there will always be a pressure differential between the opposed control surfaces of the main valve, and the pressure in control chamber 30a will always be somewhat lower than the inlet pressure. It is the metering valve which for any given temperature establishes the actual magnitude of the pressure acting downwardly on poppet 29. It will be seen that at larger pressure differentials across poppet 29, greater compression of spring 33 will be required to balance the pressure force difference, and this compression is achieved only at a more upward or open position of the poppet, and vice versa.

At lower fluid temperatures, for example 60° F., the slotted portion 39a of the movable metering valve element 39 does not extend as far into bore portion 37b and the slots therealong are relatively open. Under such conditions there is a relatively large flow through the metering orifice and across restrictor 32. The large flow across restrictor 32 creates a relatively large differential between the poppet control surfaces, opening the main valve. It will be noted that the continuous flow of system fluid past actuator 40 insures that the actuator is always responsive to circuit conditions however they may change.

As the temperature of the system fluid increases due to the work done on it, the temperature of actuator 40 also increases, causing the actuator to expand and urge slotted portion 39a of the movable metering valve element further into bore portion 37b, thereby creating a greater restriction on flow from passageway 36 to drain port 44. This increases the pressure in chamber 30a above the spool, thereby urging the spool downwardly with greater force and imposing a greater restriction on the flow of fluid from port 22 to port 23. Thus, it will be seen that poppet 29 does not act as a snap action valve, but rather restricts the flow of fluid from port 22 to port 23 to a greater or lesser extent depending upon the temperature of the oil.

The pilot valve 12 operates to cause the main valve to open fully whenever the pressure differential between ports 22 and 23 exceeds a predetermined limit established by the adjustment of screw 61. Pressure fluid in chamber 30a above poppet 29 is applied through restrictor 54 into the interior of sleeve 52 in the cap, and this pressure acts on pilot valve element 58 tending to urge it away from its seat 51. When this pressure force exceeds the sum of the force of spring 59 plus the fluid pressure force acting reversely on pilot valve element 58 due to the pressure at port 23 which is reflected through passageways 64, 35 and 63, the pilot valve 51, 58 opens thereby relieving the closing pressure above poppet 29 and opening the main valve. This provides a main valve override at excessive pressure differentials, regardless of the temperature of the oil or other fluid.

The drawing also illustrates a preferred form of hydraulic circuit, in which the temperature responsive valve 10 of this invention is incorporated, for controlling fluid motor operated means for cooling hydraulic fluid in the circuit. In the circuit which is shown, fluid from a tank or reservoir 75 is delivered by a pump P, driven by an electric motor EM or other suitable prime mover means, to a pressure line 76. Maximum pressure in line 76 may be controlled by a conventional relief valve 77 which spills excess fluid back to tank 75. A work load 79, which may be a primary fluid motor, is driven by pressure fluid from line 76, and is connected to a discharge line 78 which is connected to two parallel or branch lines 80 and 81. One of the branch lines 80 is connected to the inlet port 22 of temperature responsive valve 10. Main valve outlet port 23 is connected to a return line 82. Return line 82 leads through an oil-to-air finned heat exchanger 83, to tank 75.

The other branch line into which the work load 79 discharges, line 81, is connected to line 82 through a fluid motor 84 which drives a fan 85 disposed for circulating cooling air over heat exchanger 83. Thus, all of the fluid discharged from work load 79 will flow through one or the other or both of the parallel branch lines 80 or 81 to the cooler 83, flow in line 80 by-passing the fan motor 84.

When the main valve 26, 29 is fully open, as when the oil is cold, then most or all of the flow from work load discharge line 78 will pass directly to the return line 82 by-passing fluid motor 84. Under these conditions fan 85 will be driven only slowly or not at all, since the fluid is relatively cool and needs no further cooling. As the temperature of the fluid increases, the main valve will progressively close and impose a greater restriction on flow through it, and an increasing proportion of the flow in line 78 will be caused to flow through fan motor 84, depending on the relative magnitudes of the pressure drops across valve 10 and fan motor 84. Since the rate of operation of the fan 85 is responsive to the rate of flow though its operating motor 84, the flow of cooling air passing over the heat exchanger 83 will increase roughly as the temperature of the hydraulic fluid increases, thereby tending to keep the fluid temperature more nearly constant. When the temperature of the fluid becomes sufficiently high that main valve 26, 29 is substantially closed to the flow of fluid between ports 22 and 23, then all of the flow will pass through fan motor 84, thereby tending to operate fan 85 at its maximum rate. It is readily apparent that, in place of the fan 85 shown for purpose of illustration, motor 84 can be connected to operate other cooling media which will impart cooling at a rate depending upon the speed of motor 84.

If the pressure drop across valve 10 becomes excessive, the pilot valve section 12 will open and cause the main valve to open fully, regardless of temperature, thereby preventing an excessive back pressure on the work load 79.

While I have described herein a preferred embodiment of my invention, those skilled in the art will appreciate that the invention is not limited to the exact structure or circuitry described, but that it includes other modifications and embodiments thereof falling within the scope of the claims which follow.

I claim:
1. A temperature responsive valve comprising a main valve and a metering valve controlling the main valve;
said main valve including an inlet, an outlet, and a main valve member movable to vary flow of hydraulic pressure fluid from said inlet to said outlet, said main valve member having opposed control surfaces, one of said control surfaces being acted upon by pressure fluid from said inlet tending to move said valve member to a more open position,
the other of said control surfaces being acted upon by pressure fluid in a control chamber tending to move said valve member to a more closed position,
and a spring urging said valve member toward closed position;
said metering valve comprising, means forming a variable orifice, and a thermostatic actuator operating said variable orifice forming means to progressively close said variable orifice to the flow of fluid therethrough as the temperature of said actuator increases;
a fixed area flow restrictor;
a passageway communicating between said control surfaces;
and passage means between said control chamber of the main valve and an outlet port;
said variable orifice forming means being included in one of said passageway and passage means,
said fixed restrictor being included in the other of said passageway and passage means.
2. The valve of claim 1 wherein said actuator is immersed in fluid flowing in said valve.
3. The valve of claim 1 wherein said actuator is wholly within said passage means.
4. The valve of claim 1 wherein said varible orifice forming means comprises an element movable in a bore, one of said elements and bore having tapered axial slots formed around the periphery thereof through which fluid can flow according to the axial position of said element in said bore.
5. The valve of claim 4 wherein said actuator positions said element in said bore through a shaft which is spring urged toward said actuator.
6. The valve of claim 1 which also includes a pilot valve for releasing pressure in said control chamber when said pressure exceeds a predetermined limit.
7. The valve of claim 6 wherein said pilot valve is provided in a passage between said control chamber and said outlet.
8. The valve of claim 7 wherein said metering valve is contained within a body portion sandwiched between said pilot valve and said main valve.
9. The valve of claim 1 wherein said fixed restrictor is included in said passageway.
10. A hydraulic circuit comprising,
a source of pressure fluid and a work load operated by said source,
said workload discharging into a pair of branch lines both connected to a return line,
one of said branch lines including a fluid motor operating means for cooling fluid passing through said return line at a rate corresponding to the rate of operation of said fluid motor,
the other of said branch lines including temperature responsive valve means controlling the flow of fluid in said other branch line to decrease said flow as the temperature of said fluid increases, thereby causing a greater proportion of the fluid discharged from said work load to flow through said fluid motor and to be cooled by said cooling means.
11. The hydraulic circuit of claim 10 wherein said temperature responsive valve means comprises,
a pressure differential operated main valve,
means connected to said main valve including a variable orifice for controlling the pressure differential across said main valve,
and a thermostatic actuator for varying the area of said variable orifice in accordance with the temperature of fluid in said valve.

References Cited
UNITED STATES PATENTS 3,174,410   3/1965   Booth et al. _____ 91—419

FOREIGN PATENTS 965,951   8/1964   Great Britain.
198,094   6/1958   Austria.

EDGAR W. GEOGHEGAN, *Primary Examiner.*